US005232167A

United States Patent [19]

McCormick et al.

[11] Patent Number: 5,232,167

[45] Date of Patent: Aug. 3, 1993

[54] ELECTROMAGNETICALLY ACTUATABLE INJECTION VALVE

[75] Inventors: Michael McCormick, Charleston, S.C.; Kenneth J. Zwick, Philadelphia, Pa.; Alwin Stegmaier, North Charleston, S.C.

[73] Assignee: Robert Bosch GmbH, Stuttgart, Fed. Rep. of Germany

[21] Appl. No.: 976,757

[22] Filed: Nov. 16, 1992

[30] Foreign Application Priority Data

Nov. 16, 1991 [DE] Fed. Rep. of Germany ....... 4137786

[51] Int. Cl.[5] ....................... F16K 31/06; F02M 51/00

[52] U.S. Cl. .............................. 239/585.5; 239/585.4; 239/585.1; 251/129.18; 251/129.21; 267/177

[58] Field of Search ............... 239/585.5, 585.4, 585.1, 239/533.3, 533.6, 533.9; 251/129.18, 129.21; 267/140.2, 170, 175, 177

[56] References Cited

U.S. PATENT DOCUMENTS

| | | | |
|---|---|---|---|
| 3,646,914 | 3/1972 | Mennesson | 239/585.1 X |
| 4,783,009 | 11/1988 | Coates | 251/129.18 X |
| 4,954,799 | 9/1990 | Kumar | 251/129.18 X |
| 4,967,966 | 11/1990 | Babitzka et al. | 239/585.4 |
| 4,978,074 | 12/1990 | Weinand | 251/129.18 X |
| 5,143,301 | 9/1992 | Reiter et al. | 251/129.18 X |
| 5,170,987 | 12/1992 | Krauss et al. | 239/585.4 X |

FOREIGN PATENT DOCUMENTS

| | | | |
|---|---|---|---|
| 2062092 | 5/1981 | United Kingdom | 239/585.4 |

*Primary Examiner*—Andres Kashnikow
*Assistant Examiner*—Lesley D. Morris
*Attorney, Agent, or Firm*—Edwin E. Greigg; Ronald E. Greigg

[57] ABSTRACT

An injection valve, which overcomes residual magnetic forces and cohesive forces that act between the armature and the core to make the armature stick to the core, impeding the closing motion of the valve needle. The injection valve has a spring adjusting sleeve and a stroke adjusting sleeve for the separate adjustment of the spring force of a restoring spring and of the stroke of the valve needle: these sleeves are disposed in a through bore of a valve end cap. The stroke of the valve needle is limited by a downstream end face of the stroke adjusting sleeve, which when the injection valve is fully open rests on an upstream face end of a fastening segment of the valve needle. A remanent air gap is left between the armature and the core. The novel injection valve is especially suitable for fuel injection systems of mixture-compressing internal combustion engines with externally supplied ignition.

1 Claim, 2 Drawing Sheets

ELECTROMAGNETICALLY ACTUATABLE INJECTION VALVE

BACKGROUND OF THE INVENTION

The invention is based on an electromagnetically actuatable injection valve as defined hereinafter.

U.S. Pat. No. 3,646,914 discloses an electromagnetically actuatable injection valve for an internal combustion engine that has a tubular stroke adjustment sleeve, which is screwed into a bore of a valve end cap of a valve housing of the injection valve and serves both as a core and as a stop for a valve closing member that cooperates with a fixed valve seat. When the injection valve is open, an upstream face end of an armature that is firmly joined to the valve closing member rests on a face end of the stroke adjusting sleeve oriented toward the armature. Rotating the stroke adjusting sleeve makes it protrude more or less far into the injection valve, depending on the direction in which it is rotated. The stroke of the valve closing member can be adjusted in this way. The stroke of the valve closing member is shortened by turning the stroke adjusting sleeve inward. Conversely, the stroke is lengthened if the stroke adjusting sleeve is rotated farther out of the injection valve. By lengthening or shortening the valve closing member, the static injection quantity of the injection valve is increased or decreased, respectively.

The valve closing member is acted upon by a restoring spring, which is supported on a spring adjusting sleeve screwed into the stroke adjusting sleeve and prestresses the valve closing member in the direction of the valve seat. The magnetic force generated by the magnet coil in the excited state, which moves the armature in the direction of the magnet coil and lifts the valve closing member from the valve seat, acts counter to the force of a restoring spring. Turning the spring adjusting sleeve inward in the direction of the valve closing member increases the prestressing of the restoring spring, which lengthens the time that elapses until the injection valve is fully open. Varying the prestressing of the restoring spring adjusts the dynamic injection quantity injected during the opening or closing process. The static and dynamic injection quantity are adjusted independently of one another with the injection valve in the fully installed state.

If the injection valve is fully open, the upstream face end of the armature rests on the face end of the core toward the armature. In an ensuing closing motion, because of adhesion and residual magnetism, the armature sticks to the face end of the core, slightly delaying the onset of the closing motion. Because the closing motion of the valve closing member obeys the activation signals of an electronic control unit only with a delay, the composition of the fuel-air mixture is not optimal, which translates into increased emissions, inadequate engine power, and poor engine running properties.

OBJECT AND SUMMARY OF THE INVENTION

The injection valve according to the invention has the advantage, by comparison, that despite the possibility of separate adjustment of the static and dynamic fuel injection quantity in the fully installed injection valve, a narrow remanent air gap remains between the armature and the core when the injection valve is fully open, so that sticking of the armature to the face end of the core is precluded. The valve closing member, which is firmly connected to the armature, obeys the activation signals of an electronic control unit substantially without delay.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
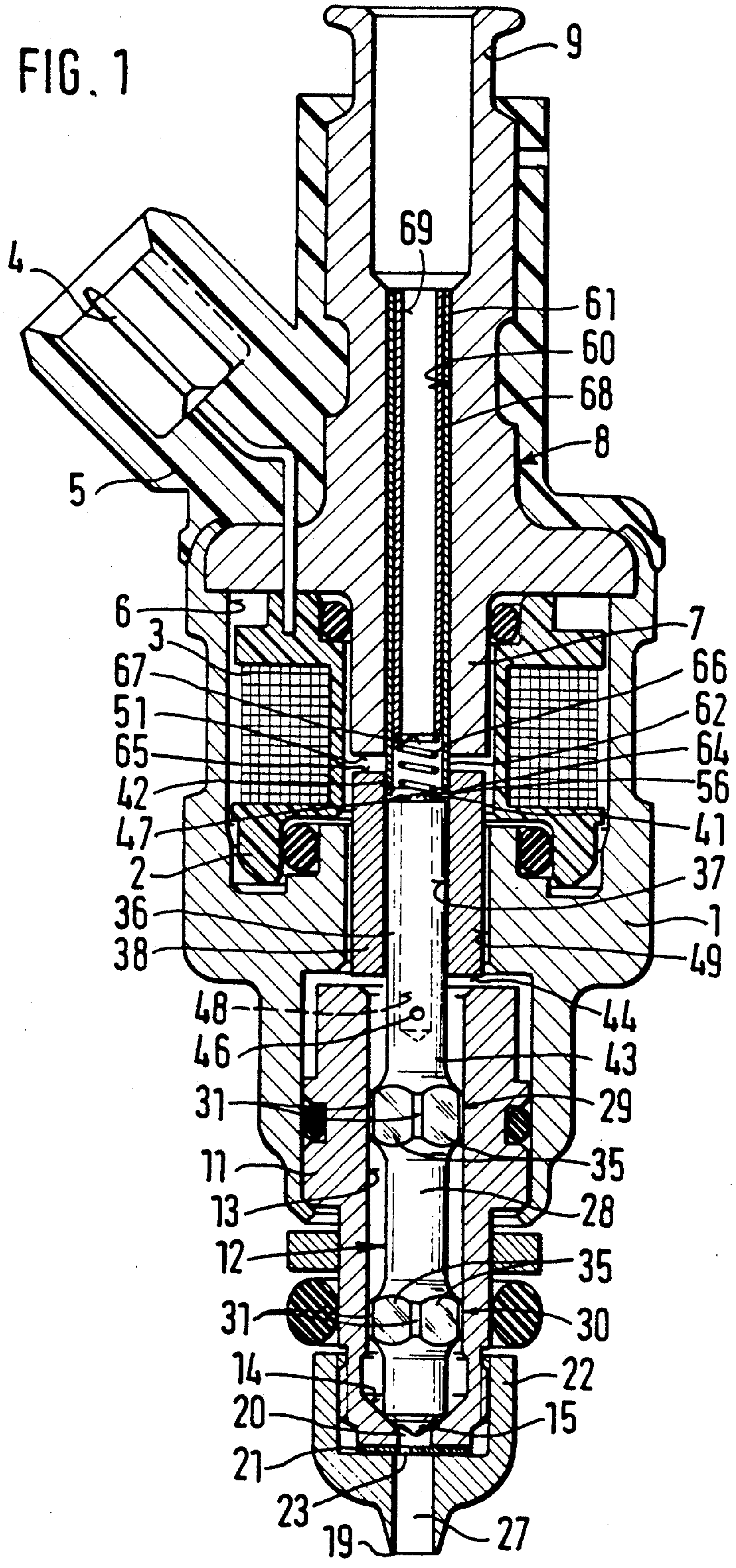
FIG. 1 is a section through an injection valve embodied according to the invention.

The injection valve of a fuel injection system of a mixture-compressing internal combustion engine with externally supplied ignition, which is shown by way of example in FIG. 1 of the drawing, has a valve housing 1 in which a magnet coil 3 is disposed on a coil holder 2. The magnet coil 3 has an electric plug connection 4, which is embedded in a plastic ring 5 that partly surrounds the valve housing 1. The coil holder 2 of the magnet holder 3 is seated in a coil chamber 6 of the valve housing 1 on a core 7, which as part of a valve end cap 8 that supplies the fuel protrudes into the valve housing 1. The valve end cap 8 is connected by a connection neck 9 to a fuel supply line, not shown. The valve housing 1, remote from the valve end cap 8, partly surrounds a nozzle body 11.

With radial spacing, a valve needle 12 passes through a guide bore 13 in the nozzle body 11. At the downstream end, the guide bore 13 changes into a the downstream end, the guide bore 13 changes into a conical valve seat face 14, which with a cone 15 embodied on the downstream end of the valve needle 12 forms a sealing seat. Toward an injection port 19, the conical valve seat face 14 changes into a nozzle body conduit 20, of cylindrical shape, for instance. The nozzle body conduit 20 is covered by a thin small plate 21, which is fastened between the nozzle body 11 and a preparation sleeve 22, which is screwed into the nozzle body 11, for example. The small plate 21 has at least one metering bore 23, which discharges into an injection conduit 27 that on the downstream end terminates in the injection port 19.

The valve needle 12 has guide segments 29, 30, which are spaced apart from one another by a spacer segment 28; for example, there are two guide segments, and they are square, for example. The sides of the guide segments 29, 30 are rounded and they form four guide faces 31 per square, which at least partly rest on the wall of the guide bore 13. The radius of the guide faces 31 is slightly smaller than the radius of the guide bore 13, so that the valve needle 12 is disposed largely without play and axially movably in the nozzle body 11. The four guide faces 31 of each square are each separated from one another by one flat overflow face 35, for instance, that does not contact the wall of the guide bore 13. Through the free cross section that remains between the wall of the guide bore 13 and the four overflow faces 35 of the square, the fuel flows past the associated guide segments 29, 30 in the direction of the injection port 19.

The valve needle 12, on the end remote from the cone 15, terminates in the form of a fastening segment 36, for instance of tubular shape, which is fitted at least partway into a receiving bore 37 of an armature 38 in such a way that an upstream face end 41 of the fastening segment 36 of the valve needle 12 is located inside the receiving bore 37 of the armature 38, and one part 42 of the wall of the receiving bore 37 is not covered by the fastening segment 36 of the valve needle 12. The fastening segment 36 of the valve needle 12 is firmly connected to the armature 38, for instance being soldered or welded. The wall of the fastening segment 36 is provided on its periphery with at least one fuel outlet opening 46, in a segment 43 between a downstream face end 44 of the armature 38 and the guide segment 29 oriented toward the armature 38. The fuel enters the fastening segment 36 of the valve needle 12 through at least one fuel inlet opening 47, located on the upstream face end 41 of the fastening segment 36 of the valve needle 12, and follows a central bore 48, which it leaves again through the fuel outlet opening 46. Via the guide segments 29, 30, the fuel flows in the direction of the injection port 19.

The valve housing 1 has a housing bore 49, which is coaxial with the guide bore 13 of the nozzle body 11 and through which the armature 38 protrudes with play. When the magnet coil 3 has electric current flowing through it, the armature 38 is pulled in the direction of a downstream end face 51 of the core 7. The cone 15 of the valve needle 12 that is firmly connected to the armature 38 lifts away from the valve seat face 14 and opens up an annular-gap-like cross section, through which the fuel, under pressure, flows in the direction of the injection port 19.

Figure 2:
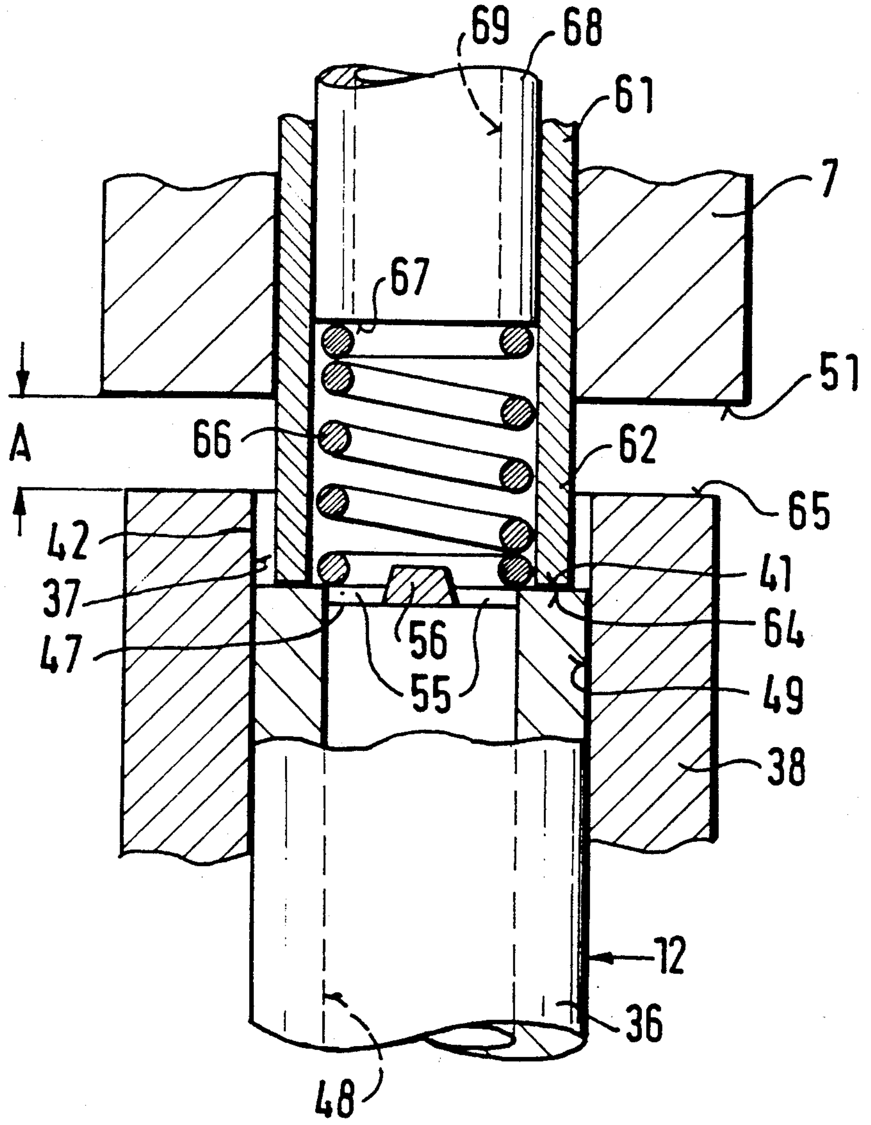
FIG. 2, on a larger scale, shows a detail of the injection valve with an armature, a stroke adjusting sleeve and a spring adjusting sleeve.

In a through bore 60 of the valve end cap 8 that is coaxial with the receiving bore 37 of the armature 38, a tubular stroke adjusting sleeve 61 is disposed in such a way that an overhang 62 of the stroke adjusting sleeve 61 protrudes out of the core from the downstream end of the through bore 60. The stroke adjusting sleeve 61 is press-fitted into the through bore 60, for example, so that the depth of the press fit of the stroke adjusting sleeve 61 into the through bore 60 of the valve end cap 8 can be varied by displacing the stroke adjusting sleeve with an adjusting device, not shown. Any shift in the press-fit depth from the forces operative during operation is prevented by the positive connection of the stroke adjusting sleeve 61 with the through bore 60. The overhang 62 of the stroke adjusting sleeve 61 has a slightly smaller diameter than the receiving bore 37 for the armature 38, and even when the injection valve is completely closed it protrudes at least partway into the part 42 of the receiving bore 37 that is not covered by the fastening segment 36 of the valve needle 12. If the injection valve is fully opened, as shown in FIG. 2 of the drawings, then a face end 64 of the stroke adjusting sleeve 61 oriented toward the armature 38 rests on the upstream face end 41 of the fastening segment 36 of the valve needle 12. Even in the completely open state of the injection valve, a remanent air gap remains between the end face 51 of the core 7 oriented toward the armature 38 and an upstream face end 65 of the armature 38; in FIG. 2, this remanent air gap is marked "A". This remanent air gap "A" prevents the armature 38 from sticking to the core 7.

If there were contact between the armature 38 and the core 7, residual magnetic forces and cohesive forces between the armature 38 and the core 7 would make the armature 38 stick to the core 7. The thereby retarded closing motion of the valve needle 12 would mean that the closing motion of the valve needle 12 would not exactly obey the activating signals of a control unit (not shown), for instance an electronic control unit. Hence the quantity of fuel actually injected by the injection valve would not exactly match the fuel quantity appropriate for the mass of air aspirated by the engine. The mixture formed from the air and the injected fuel would accordingly not have an optimal composition, which would lead to power losses, increased emissions, and poorer engine running properties.

The depth of the press fit of the stroke adjusting sleeve 61 determines the stroke of the valve needle 12 and thus the static injection quantity of the injection valve. If the stroke adjusting sleeve 61 is inserted farther into the valve end cap 8, then the overhang 62 of the stroke adjusting sleeve 61 that protrudes out of the core 7 becomes longer, and the stroke of the valve needle 12 becomes shorter. The shortened stroke of the valve needle 12 results in a reduced static injection quantity.

The valve needle 12 is acted upon by a restoring spring 66, which prestresses the valve needle 12 in the direction of a closing position of the injection valve. The restoring spring 66 is supported at one end on intersecting ribs 55, for instance two in number, which separate the fuel inlet openings 47 of the fastening segment 36 of the valve needle 12, and on the other end on a downstream face end 67 of a tubular spring adjusting sleeve 68. A guide tang 56 which centers the downstream end of the restoring spring 66 is formed at the intersection of the two ribs 55. The spring adjusting sleeve 68 is disposed, for instance with a press-fit, coaxially in the stroke adjusting sleeve 61, so that the spring adjusting sleeve 68 can be displaced with an adjusting device, not shown, independently of the stroke adjusting sleeve 61 in order to adjust the spring force of the restoring spring 66. The positive connection of the spring adjusting sleeve 68 with the stroke adjusting sleeve 61 prevents a shift in position of the spring adjusting sleeve 68 from the forces arising during operation, however. The fuel flows from the connection neck 9 of the valve end cap 8 through an internal cross section 69 of the spring adjusting sleeve 68 in the direction of the injection port 19.

The position of the spring adjusting sleeve 68 relative to the upstream face end 41 of the fastening segment 36 of the valve needle 12 determines the prestressing of the restoring spring 66 and its force upon the valve needle 12. The opening motion of the valve needle 12 is definitively determined by the force, effecting the opening motion, upon the armature 38 of the magnet coil 3 with current flowing through it and by the contrary force of the restoring spring 66. If the spring force is increased by displacement of the spring adjusting sleeve 68 toward the face end 41 of the valve needle 12, the acceleration of the opening motion decreases and the acceleration of the closing motion increases, with the resultant increase or decrease, respectively, in the dynamic injection quantity.

After the adjustment, the stroke adjusting sleeve 61 and the spring adjusting sleeve 68 can additionally be fixed in their position, for instance by soldering, welding or pinching. The static and the dynamic injection quantity can be adjusted separate from one another with the aid of the stroke adjusting sleeve 61 and the spring adjusting sleeve 68. The embodiment of the injection valve according to the invention prevents the armature 38 from touching the core 7 and sticking to it briefly, especially when the injection valve is fully open. The injection valve is especially suitable for fuel injection systems of mixture-compressing internal combustion engines with externally supplied ignition.

The foregoing relates to a preferred exemplary embodiment of the invention, it being understood that other variants and embodiments thereof are possible within the spirit and scope of the invention, the latter being defined by the appended claim.

WHAT IS CLAIMED AND DESIRED TO BE SECURED BY LETTERS PATENT OF THE UNITED STATES IS:

1. An electromagnetically actuatable injection valve for internal combustion engines, having a core which is surrounded by a magnet coil and toward which an armature is movable, a valve closing member that cooperates with a fixed valve seat is secured to and movable by said armature, a stroke adjusting sleeve is disposed in the core for adjusting a stroke of the valve closing member, a valve closing restoring spring is positioned between one end of said valve closing member and a spring adjusting sleeve disposed in the stroke adjusting sleeve, prestressing of said valve closing restoring spring is adjustable by an axial movement of said stroke adjusting sleeve in said stroke adjusting sleeve said stroke adjusting sleeve extends axially beyond said spring adjusting sleeve whereby with the injection valve fully open, and with the valve closing member (12) resting on the stroke adjusting sleeve (61), a remanent air gap exists between one end face (65) of the armature (38) and one end face (51) of the core (7), said gap prevents a contact of the armature (38) with the core (7).

* * * * *